Oct. 24, 1939.　　　M. P. GEIGER　　　2,177,523
UTILITY TYING TRAY
Filed June 16, 1938　　　3 Sheets-Sheet 1
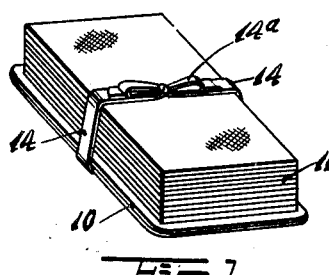
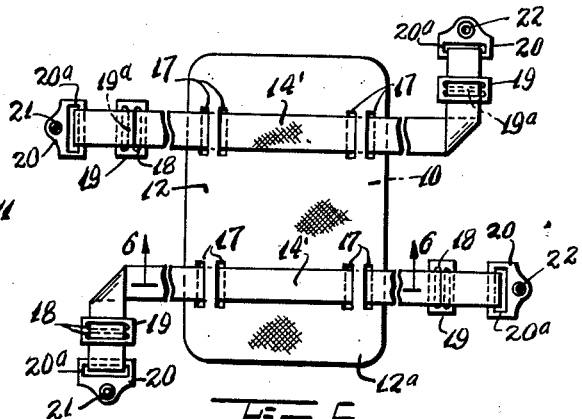
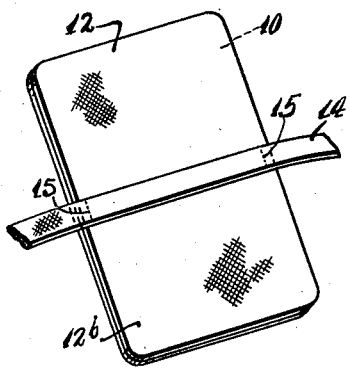
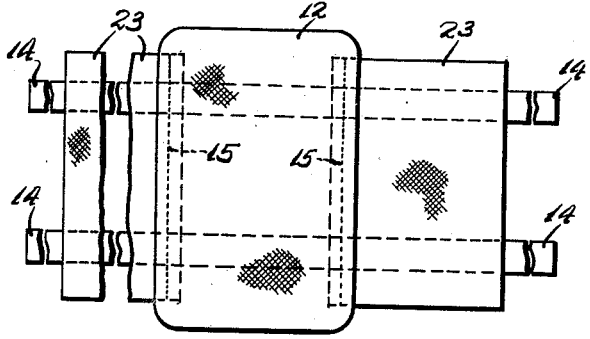
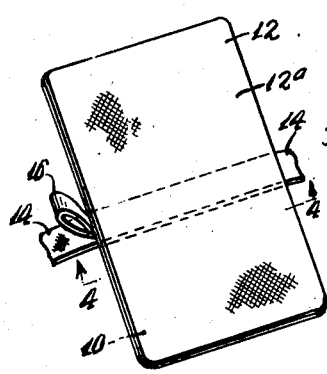
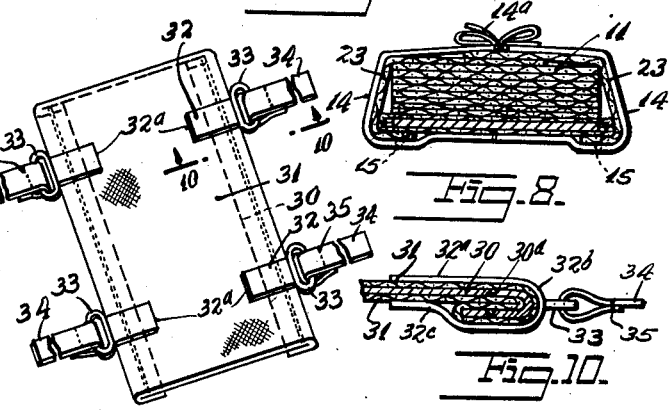
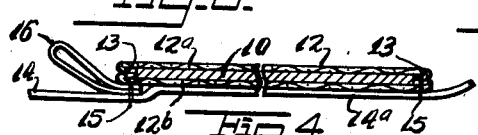
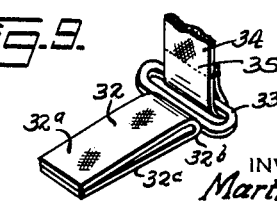
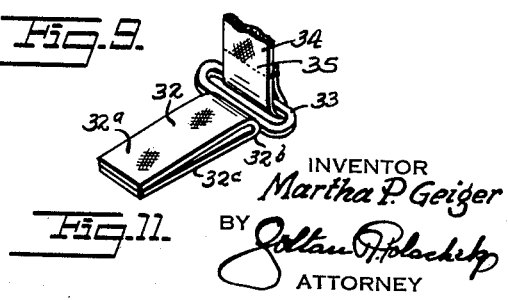
INVENTOR
Martha P. Geiger
BY
Zoltan Holochek
ATTORNEY Oct. 24, 1939.   M. P. GEIGER   2,177,523
UTILITY TYING TRAY
Filed June 16, 1938   3 Sheets-Sheet 2
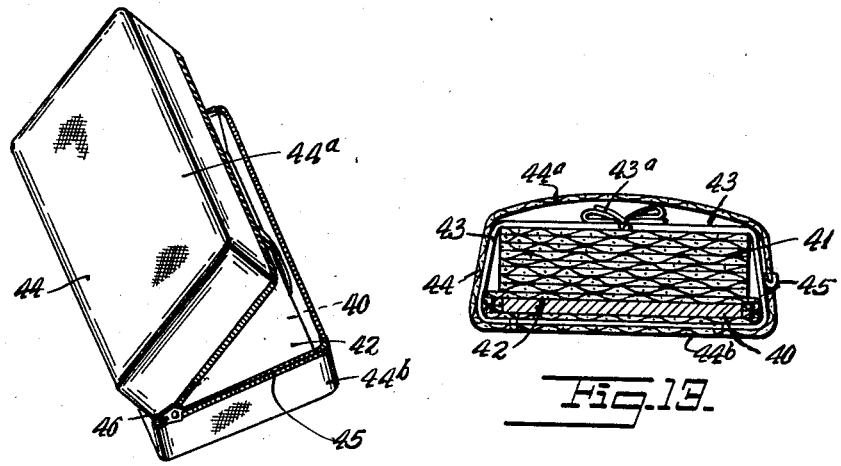
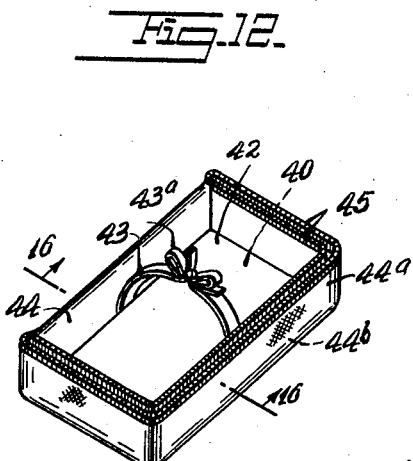
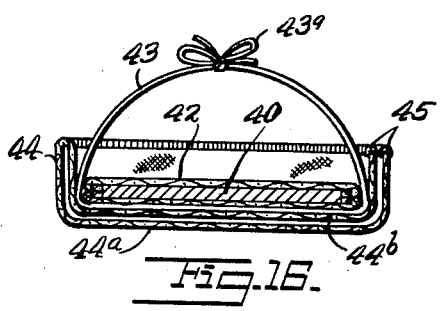
INVENTOR
Martha P. Geiger
BY
Zoltan H. Polachek
ATTORNEY Oct. 24, 1939.  M. P. GEIGER  2,177,523
UTILITY TYING TRAY
Filed June 16, 1938  3 Sheets-Sheet 3

INVENTOR
Martha P. Geiger
BY
Zoltan Holochik
ATTORNEY

Patented Oct. 24, 1939

2,177,523

UNITED STATES PATENT OFFICE 2,177,523

UTILITY TYING TRAY

Martha P. Geiger, Brooklyn, N. Y.

Application June 16, 1938, Serial No. 214,162

2 Claims. (Cl. 190—35)

This invention relates to new and useful improvements in a utility tray.

More specifically, the invention proposes the construction of a tying tray characterized by the provision of a rigid flat member for supporting folded garments and having tie strings associated therewith for securing the folded garments in position upon the members.

Still further it is proposed to provide the rigid flat member with a decorative cover for enclosing same and to have tie strings fixedly connected with said decorative cover.

A further object of this invention is to provide flap elements attached upon the sides of said member and extendable over said folded garments in a manner to be normally disposed between said garments and said tie strings for holding the flaps in position upon the garments.

Still further it is proposed to construct the flat member with a plurality of longitudinal scored areas along its sides which may be folded under to various degrees, and the provision of a means for permitting the tie strings to be associated with the rigid flat member in all of its adjusted positions.

Still further it is proposed to provide small metallic two-armed clips engageable over the edge portions of the rigid member for holding it in its adjusted positions and having a loop member mounted thereon and upon which the tie strings are adapted to be attached.

Still further it is proposed to provide a cloth covering open on three sides and adapted to be closed by slide fasteners for entirely encasing the rigid flat member, the folded goods supported thereon, and the tie strings.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a utility tying tray constructed according to this invention and showing the manner in which it is adapted to be used.

Fig. 2 is a bottom perspective view of the utility tying tray per se.

Fig. 3 is a top perspective view of the utility tying tray.

Fig. 4 is a sectional view on the line 4—4 of Fig. 3.

Fig. 5 is an elevational view of a tying tray constructed according to a modification of the invention.

Fig. 6 is an enlarged sectional view on the line 6—6 of Fig. 5.

Fig. 7 is a view similar to Fig. 5 illustrating a still further modification of the invention.

Fig. 8 is a sectional view taken through the center of the tying tray shown in Fig. 7 and showing the manner in which it is adapted to be used.

Fig. 9 is a perspective view similar to Fig. 3 illustrating a still further modification.

Fig. 10 is an enlarged sectional view on the line 10—10 of Fig. 9.

Fig. 11 is a perspective view of the two-armed clip per se.

Fig. 12 is a perspective view of a utility tying tray constructed according to a still further modification of the invention.

Fig. 13 is a view similar to Fig. 8 illustrating the manner in which the tray shown in Fig. 12 is adapted to be used.

Fig. 14 is a partial perspective view of one of the rear corners of the modification shown in Fig. 12.

Fig. 15 is another perspective view of the same, with the cover turned about the bottom of the bottom portion of the box.

Fig. 16 is a vertical sectional view taken on the line 16—16 of Fig. 15.

Fig. 17 is a fragmentary sectional view, similar to Fig. 10, but illustrating another form of the invention.

Figure 19:
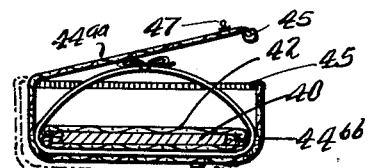
Fig. 19 is a vertical sectional view taken on the line 19—19 of Fig. 18.

The utility tray includes a rigid flat member 10 for supporting folded garments or articles 11. The rigid flat member 10 is constructed from a piece of substantially flat cardboard, wood, metal or other similar material and is adapted to have the folded garments 11 stacked thereupon in a superimposed position.

A decorative cover 12 is provided for encasing the member 10. The decorative casing is formed from separate sections of decorative cloth material 12a and 12b which are adapted to extend across the two faces of the rigid flat member 10. The edge portions of the sections 12a and 12b are adapted to be securely attached together by means of stitches 13.

A tie string 14 is provided for securing the folded garments 11 in position upon the rigid flat member 10. The tie string 14 has its intermediate portion 14a extending across the bottom of the rigid flat member 10 and is securely attached to the panel 12b of the decorative covering 12 by means of stitches 15. The ends of the tie strings 14 are adapted to be extended upwards along the sides of the folded garments positioned upon the rigid member 10. The ends are then extended across the top of the folded garments and the adjacent ends tied into a bow 14a for maintaining the folded garments in position upon the tray.

A loop 16 is formed at one side of the tray and has its ends inserted between the adjacent faces of the tie string 14 and the decorative covering 12 and is held in position by means of stitches 15. This loop is provided for permitting the tying tray to be hung up when not in use.

According to the modification shown in Figs. 5 and 6, the construction of the rigid flat member 10 and the decorative covering is similar to the previous form of the invention differentiating merely in the inclusion of two tie strings 14' positioned upon the tray near the ends thereof and each of which is adjustable for accommodating folded garments stacked in different heights. Each of the tie strings 14' is adapted to have its intermediate portion passed through a plurality of openings 17 extended through both the decorative covering 12 and the rigid flat member 10 for permitting the position of the tie strings to be adjusted with relation to the tray by merely extending greater portions of the tie strings from either side of the tray. This is accomplished by grasping and manually pulling either end of the tie strings, depending upon the adjustment required for extending the side pulled.

Each of the tie strings is provided at each of its ends with a means for permitting the length of the tie strings to be adjusted to accommodate different quantities of folded garments. This adjustment is accomplished in a conventional manner by passing the ends of the tie strings 14' through openings 18 formed in small metallic members 19.

The free ends of the tie strings 14' are adapted to be securely attached to an intermediate bar 19a dividing off the openings 18. This permits the small metallic member 19 to be slid along the length of the tie strings 14' to control the length thereof.

The adjacent ends of the tie strings 14' are provided with a means for permitting the ends to be releasably secured together for fixedly holding the folded garments in position upon the tray. This means includes small metallic members 20 having openings 20a through which the end portions of the tie strings 14' are adapted to be slidably engaged. The metallic member 20 at one end of each of the tie strings 14' is provided with a snap fastener element 21 which is adapted to engage a complementary snap fastener element 22 attached to the metallic member 20 upon the other end of each of the tie strings 14'. This permits the tie strings 14' to be passed around the folded garments 11 to permit the ends to be securely attached together.

According to the modification shown in Figs. 7 and 8, the construction of the utility tying tray is similar to that described in the previous forms of the invention except for the provision of flap elements 23 attached to the edge portions of the tray and engageable over the folded garments positioned thereon for covering them. These flaps 23 have their edge portions securely attached to the decorative covering 12 by means of stitches 15 which hold the tie strings 14 in position thereon.

As shown in Fig. 8 after the folded garments 11 have been stacked in position, the flaps 23 are extended upwards along the sides of the folded garments and thence across the top thereof to a position in which the free edges of the flaps will be overlapped for completely covering the garments. Then the tie strings are extended over the flaps in a manner similar to that previously described and tied into a bow 14a for maintaining the flaps in position upon the folded garments and maintaining the folded garments in position upon the tray.

According to the modification shown in Figs. 9 to 11 a rigid flat member 30 is provided for supporting a plurality of folded garments and has longitudinal scored areas 30a formed along its sides by which portions of the tray may be folded under to various degrees to accommodate the tray to folded garments of various contours. A decorative covering 31 encases the entire circumference of the rigid flat member 30 and is adapted to be folded therewith as clearly shown in Fig. 10.

A plurality of two-armed clips 32 are adapted to be mounted upon the edge portions of the rigid member 30 for holding the folded areas as desired. These two-armed clips are constructed from strips of spring steel or similar material and each consists of a top arm 32a substantially flat throughout its entire length for extending across the top face of the rigid flat member 30. The top arm 32a continues into a bent intermediate portion 32b for extending around the edge portion of the rigid member 30. The bent intermediate portion 32b continues into a bottom arm 32c formed with a slight curvature throughout its entire length for engaging across the bottom of the right flat member 30 with its end engaging against the bottom face of the flat member for rigidly maintaining the folded under portions fixedly in position. The manner in which the clip 32 acts to hold the folded under portions in position is clearly shown in Fig. 10.

Each of the two-armed clips 32 is formed with a loop member 33 which extends laterally from the bent over portion 32b. A tie string 34 is provided for each of the loop members and has one of its ends passed through the loop member and securely attached thereto by means of stitches 35. When the two-armed clips are in position on the edge portion of the rigid member 30, the tie strings 34 are adapted to be extended over the folded garments to permit the adjacent ends to be tied together for holding the garments in position thereon.

The operation of this form of the device is as follows:

The folded garments are positioned on the tray and the edge portions thereof may be bent under to control the side of the tray to accommodate it to the size of the area covered by the folded garments. That is, if the folded garments are large, the tray may be completely extended and if the folded garments are small a portion of the tray may be bent under to decrease its size and make it conform with the size of the folded garments. The clips 32 are then positioned upon the edge portions of the tray for maintaining the folded under areas in position and for permitting the strings 34 to be used for maintaining the folded garments in position upon the tray.

According to the modification shown in Figs. 12 to 16 a rigid flat member 40 for supporting a plurality of goods 41 is provided with a decorative covering 42. The decorative covering completely encases the member 40. Tie strings 43 are associated with the decorative covering in a manner similar to that described in the previous forms of the invention and is adapted to be extended upwards over the folded garments and be tied into a bow 43a for maintaining the folded garments in position upon the rigid member 40.

A box-like covering 44 of cloth material is adapted to be engaged completely around the rigid member 40 and the folded garments 41 for completely encasing the same as shown in Fig. 13. The box-like covering 44 is open along three of its sides and is adapted to be closed by means of a slide fastener 45 controlled by a slide member 46. The rear wall of the box-like covering 44 is not provided with an opening and acts as a hinge for the top portion 44a to permit it to be moved to an open position away from the bottom portion 44b when the slide fasteners 45 are in their open position for exposing the interior thereof to permit the folded garments 41 to be positioned upon the rigid member 40 and removed therefrom as desired.

Fig. 17, a binding strip 12c has been shown, covering the edge of the rigid flat member 10. The decorative cover 12 partially overlaps the binding strip 12c.

Figure 18:
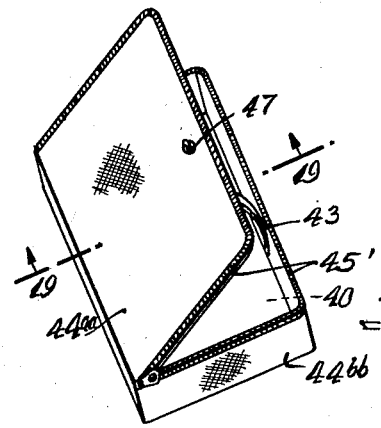
Fig. 18 is a similar view to Fig. 12 but illustrating a still further form of the invention.

In Figs. 18 and 19, the slide fastener 45' is arranged at the upper edge of the bottom portion 44bb and along the three free edges of the top cover portion 44aa. In other respects this form of the invention is similar to the forms illustrated in Fig. 12. The top cover portion 44aa may be folded under the bottom portion when desired and secured there in position by a snap fastener 47 or other suitable arrangement.

Figure 22:
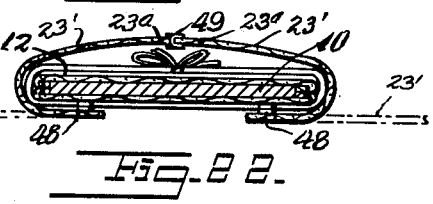
Fig. 22 is an enlarged sectional view taken on the line 22—22 of Fig. 20.
Figure 20:
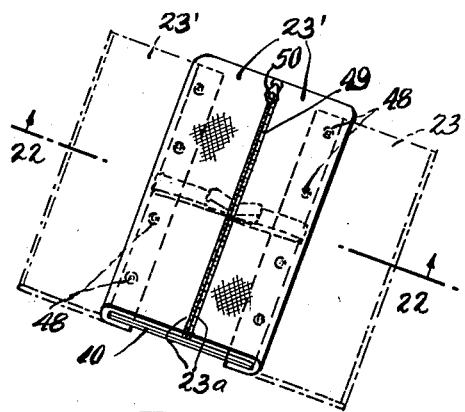
Fig. 20 is another top perspective view of a still further modified form of the invention.
Figure 21:
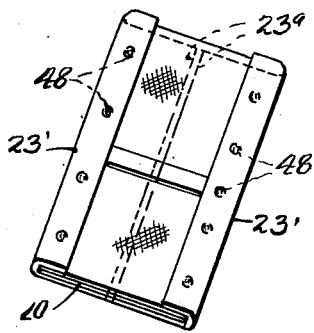
Fig. 21 is a bottom perspective view of the device illustrated in Fig. 20.

In Figs. 20, 21 and 22, the flaps 23' may be of transparent or any other suitable material and held at the bottom of the rigid flat member 10 by snap fasteners 48 or the like so that they may be detached from the said flat member when desired. The top edges 23a of flaps 23' are joined by slide fastener members 49 which may be closed or separated by the conventional slide member 50.

By means of this arrangement it is possible to fully cover the article placed on the rigid flat member 10 and to either fold the flaps under the said rigid member or remove it entirely therefrom when it is desired to display the article on the utility tray.

Figure 23:
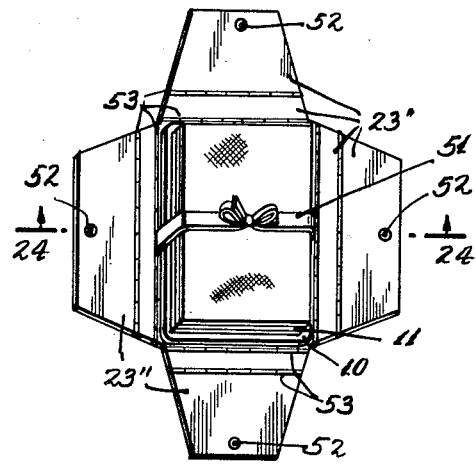
Fig. 23 is a perspective view similar to Fig. 1 but illustrating a still further modification.
Figure 24:
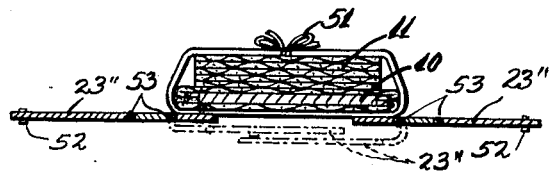
Fig. 24 is a vertical sectional view taken on the line 24—24 of Fig. 23.

In Figs. 23 and 24, four flaps 23" are provided which may be held together in the folded position by a decorative ribbon 51 passing through eyelets 52 in the superimposed flap members. Instead of a ribbon, snap fasteners or any other means may be used for securing these flaps 23" together. The flaps 23" are made of solid material and are provided with suitable hinges 53. They may be folded under the rigid flat member 10 when so desired. In other respects this form of the invention is also similar to the previous forms.

Figure 25:
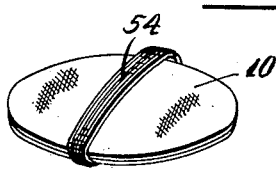
Fig. 25 is a perspective view of another form of the utility tray.

In Fig. 25 the rigid flat member 10 is shown to be round and is provided with an elastic band 54 which may be either permanently or detachably secured to the flat member 10.

It is to be understood that the shape of the utility tying tray may be changed as desired and the decorative cover may be of any suitable material, to harmonize with the surroundings or with the article tied thereon. The utility tray may also be made of composition, metal, or any other suitable material.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A utility tying tray, comprising a rigid flat member for supporting folded garments and having longitudinal scored areas along its sides which may be folded under to various degrees, a decorative covering encasing said member, two-armed clips mounted on the edge portions of said rigid member for holding the folded areas as desired, and loop members on the outer ends of said clips, and tie strings attached on said loop members and adapted to extend over said folded garments for securing them in position.

2. A utility tying tray, comprising a rigid flat member for supporting folded garments and having longitudinal scored areas along its sides which may be folded under to various degrees, a decorative covering encasing said member, two-armed clips mounted on the edge portions of said rigid member for holding the folded areas as desired, and loop members on the outer ends of said clips, and tie strings attached on said loop members and adapted to extend over said folded garments for securing them in position, each of said two-armed clips being constructed from a piece of spring steel or similar material and consisting of a substantially flat top arm for extending partially across the top face of said rigid member, said flat top arm continuing into a bent around intermediate portion for engaging around the edge portion of said tray, and a bottom arm continuing from said bent around intermediate portion and being formed with a slight curvature throughout its entire length and for extending partially across the bottom face of said rigid member for maintaining said folded under portion fixedly in position.

MARTHA P. GEIGER.